L. C. CRESCIO.
MICROMETER GAGE.
APPLICATION FILED AUG. 12, 1914.
1,124,867.
Patented Jan. 12, 1915.
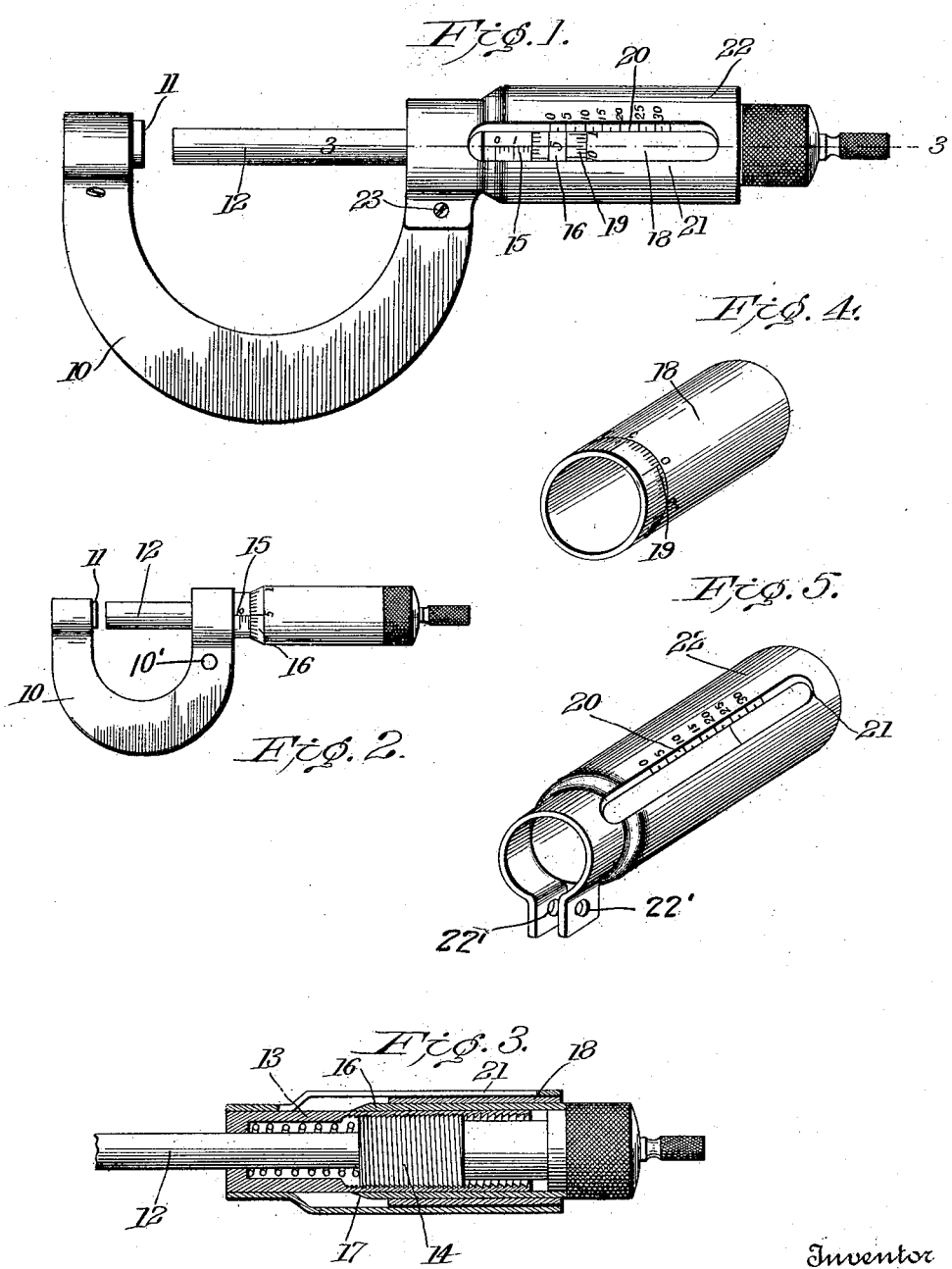

UNITED STATES PATENT OFFICE.

LOUIS C. CRESCIO, OF NEW YORK, N. Y.

MICROMETER-GAGE.

1,124,867.

Specification of Letters Patent.

Patented Jan. 12, 1915.

Application filed August 12, 1914. Serial No. 856,403.

*To all whom it may concern:*

Be it known that I, LOUIS C. CRESCIO, a citizen of the United States, and resident of New York, county and State of New York, have invented certain new and useful Improvements in Micrometer-Gages, of which the following is a specification.

This invention relates to micrometer gages and more particularly to means adapted to be attached to the ordinary micrometer gage whereby the latter may be used to indicate measurements of a different standard from that in which the gage itself is calibrated.

The invention is illustrated in the accompanying drawings, in which,

Figure 1 is a side elevation of a common form of micrometer gage having my improvements applied thereto; Fig. 2 illustrates the form of gage which is shown in Fig. 1; Fig. 3 is a longitudinal section through the operating parts of the gage on the line 3—3 of Fig. 1; Fig. 4 is a perspective view of the tubular member which is applied to the revoluble barrel of the gage; Fig. 5 is a perspective view of the tubular member which is attached to the frame of the gage.

Referring to the drawings, 10 indicates the frame, 11 the anvil and 12 the adjustable spindle. Secured to the frame 10 is a tubular member 13 which is internally threaded to receive the threaded part 14 of the spindle. On its exterior the tubular member 13 is provided with a scale 15 of any standard of measurement, this scale extending longitudinally of the tubular member. A tubular member or barrel 16 is revolubly arranged on the exterior of the member 13 and is rigidly secured to the spindle 12. The inner end of the barrel 16 is beveled, as shown at 17, and provided with a circumferentially extending scale which coöperates with the scale 15. The parts thus far described constitute the common form of micrometer gage to which my improvements are attached.

I arrange on the exterior of the barrel 16 a tubular member 18, this tubular member closely fitting the barrel so as to revolve therewith. The member 18 is provided with a circumferentially extending scale 19 which coöperates with a scale 20 on one side of a slot 21 in the tubular member 22. The member 22 surrounds the tubular member 18 and is secured to the frame 10 by means of a screw 23, which passes through openings 10' and 22' in the frame 10 and member 22, respectively. The slot 21 is preferably so arranged that the scales of the members 13, 16 and 19 may be seen through it for all positions of the barrel 16. The scale 20 may be of a different standard of measurement from the scale 15 so that it will be possible to use the gage for two different standards of measurement and as will be readily understood the measurement is shown on both scales simultaneously and without requiring any adjustment of the parts.

I do not claim to be the first to provide a micrometer gage having scales for indicating measurements in different standards, but I do claim to be the first to provide readily detachable means which may be applied to the ordinary gage for the purpose of enabling the gage to be used for different standards.

Having thus described my invention what I claim is,

1. The combination with a micrometer gage having a revolving barrel and a scale with which said barrel coöperates, of a tubular member fitting upon and revoluble with said barrel and having a circumferentially extending scale, and a member secured on the frame of the gage and having a scale extending longitudinally of said barrel and coöperating with said circumferentially extending scale to indicate measurements.

2. The combination with a micrometer gage having a revolving barrel and a scale with which said barrel coöperates, of a tubular member fitting upon and revoluble with said barrel and having a circumferentially extending scale, and a tubular member secured to the frame of the gage and inclosing the first-mentioned tubular member and having a longitudinal slot through which both of said scales may be observed, one side of said slot being provided with a scale coöperating with said circumferentially extending scale.

3. In a micrometer gage, the combination of a frame, an anvil thereon, a movable spindle, two concentrically arranged tubular members secured to said frame and each of which is provided with longitudinally extending scales, and a revoluble tubular member arranged between the first mentioned tubular members and to which said spindle is attached.

4. In a micrometer gage, the combination of a frame, an anvil thereon, a movable spindle, two concentrically arranged tubular members secured to said frame and each having a longitudinally extending scale, said scales having different standards of measurement, and a tubular member connected with said spindle and arranged between said first mentioned tubular members and having circumferentially arranged indicating means coöperating with said scales.

5. The combination of a tubular member having a longitudinally extending slot and a scale along one side of the slot, and a second tubular member adapted to fit within the first tubular member and having a circumferentially arranged scale, one of said tubular members being adapted to be secured to the frame of a micrometer gage, and the other member being adapted to be secured to the revolving barrel of the gage.

In testimony whereof I affix my signature in presence of two witnesses.

LOUIS C. CRESCIO.

Witnesses:
H. E. GRABAR,
OTTO L. MAURER.

Copies of this patent may be obtained for five cents each, by addressing the "Commissioner of Patents Washington, D. C."